United States Patent Office 3,582,520
Patented June 1, 1971

---

3,582,520
STABILIZATION OF UNSATURATED INTERPOLYMERS
Marco Wismer, Gibsonia, and Karl F. Schimmel, Verona, Pa., assignors to PPG Industries, Inc., Pittsburgh, Pa.
No Drawing. Filed Sept. 30, 1968, Ser. No. 763,909
Int. Cl. C08f 45/60
U.S. Cl. 260—45.9          10 Claims

ABSTRACT OF THE DISCLOSURE

This invention relates to the stabilization of interpolymers of ethylenic hydrocarbons and a polyene, which interpolymers cure through an oxidative mechanism. It has been found that aldimines and ketimines stabilize the interpolymer against apparent autoxidation, as evidenced by film yellowing, without interfering substantially with the oxidative cure of the films.

---

Recently, interpolymers of ethylenic hydrocarbons and cyclic polyenes have been obtained which contain appreciable residual unsaturation sufficient, for example, to permit them to be cured by an oxidative mechanism in air. Interpolymers of this type are disclosed, for example, in copending applications Ser. Nos. 413,326, filed Nov. 23, 1964, now U.S. Pat. No. 3,496,129, issued Feb. 17, 1970; 460,544, filed June 1, 1965; and 502,312, filed Oct. 22, 1965. These interpolymers contain a substantial proportion of cyclic polyene interpolymerized with one or more monoolefins having a single copolymerizable ethylenic group. They are obtained by polymerization in the presence of a transition metal catalyst.

While these unique interpolymers have many desirable properties, such as the production of quality high solids coating compositions, it has been found that apparently since these interpolymers before curing contain substantial unsaturation, they tend to yellow and embrittle after curing, apparently due to the fact that residual unsaturation remains in the interpolymer even after curing to a substantial degree, that is, to a solvent-resistant state. Since a major useful property of the interpolymer is the fact that they do cure by an oxidative mechanism, the use of conventional antioxidants which would interfere with this oxidative mechanism is prohibited.

It has been found that certain aldimines and ketimines corresponding to the formula.

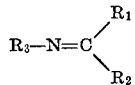

where $R_1$ and $R_2$ are independently selected from the group consisting of hydrogen, alkyl, and aryl and where $R_3$ is selected from the group consisting of alkyl, aryl and alicyclic hydrocarbons, act as latent antioxidants or stabilizers, that is, they allow the interpolymers to cure by an oxidative mechanism; however, after substantial curing is obtained, they apparently function to inhibit yellowing of the films, especially upon baking or exposure to heat.

From among the preferred aldimines and ketimines are those where $R_1$ and $R_2$ are independently selected from the group consisting of hydrogen, alkyl and aryl containing the phenyl nucleus. Preferably, where $R_1$ and $R_2$ are organic radicals they contain up to a total of 20 carbons. Preferably, $R_3$ is phenyl, cyclohexyl or alkyl containing 1 to 10 carbon atoms.

Examples of these compounds include the following:

Phenyl acetaldehyde aldimine
Cyclohexyl propionaldehyde aldimine
Ethyl butyraldehyde aldimine
Octyl heptaldehyde aldimine
Phenyl dodecylaldehyde aldimine
p-Ethylphenyl acetaldehyde aldimine
Phenyl acetone ketimine
Cyclohexyl methylethyl ketone ketimine
Ethyl methyl propyl ketone ketimine
Propyl hexanone-3-ketimine
Butyl methyl undecyl ketone ketimine
Nonyl ethyl hexyl ketone ketimine The non-rubbery interpolymers utilized in the invention have several distinguishing characteristics over the rubbery polymers previously known in the art, including the following:

(1) These interpolymers contain a comparatively high degree of functional unsaturation which permits them to be substantially cured, if desired, by an oxidative mechanism. (That is, a thin film of the interpolymer itself upon exposure to air and without added curing agents cures sufficiently to become tack-free and essentially insoluble in aliphatic hydrocarbons, such as heptane.) These interpolymers contain at least about 3.5 weight percent unsaturation, as defined below, and preferably contain at least about 4 percent or more. They may have up to about 25 weight percent unsaturation or even more.

(2) The interpolymers herein are of relatively low molecular weight, as indicated by their intrinsic viscosity. The intrinsic viscosity of the present interpolymers is preferably no higher than about 0.9, and usually is 0.6 or lower.

(Intrinsic viscosity is described, for example, in the book by Allen entitled Techniques of Polymer Characterization, Butterworth Publications, Ltd., London (1959); the values herein being measured in benzene at 25° C. using an Ubbelohde Dilution Viscometer.)

(3) The interpolymers employed are quite soluble in organic solvents, permitting them to be dissolved in appreciable concentrations while maintaining a usable solution viscosity. For example, there can be obtained solutions of the present interpolymers in benzene, xylene, aromatic naphtha, or other solvents containing as much as 70 percent or more resin solids and having a utilizable viscosity.

Many of the properties of these interpolymers are attributable in large part to their structures, which include as essentially saturated carbon chain as the polymer backbone, this chain containing a substantial proportion (i.e., 20 percent or more) of the total carbon atoms in the polymer molecule. Only a small amount of ethylenic unsaturation is in the polymer backbone, and this principally in the terminal position, with at least a major part of the unsaturated linkages remaining in the polymer molecules being in pendant groups attached to the main polymer chain.

As indicated, the interpolymers prior to oxidation have at least about 3.5 percent by weight of unsaturation in the polymer molecule. "Percent by weight of unsaturation" as employed herein refers to the weight of groups of the structure

compared to the total weight of interpolymer. For instance, 2 percent by weight of unsaturation means 100 grams of interpolymer contain 2 grams of carbon present in groups of the structure

It may be noted that accurate determination of the extent of unsaturation in these products by common analytical techniques is quite difficult. For example, ordinary iodine value determinations have been found to be unreliable, and accurate analysis by chemical means in general requires very tedious and time-consuming procedures. One method which can be used is infrared spectroscopic examination, while another method for determining the extent of unsaturation is by means of nuclear magnetic resonance spectroscopy, such a method being described in the above-mentioned copending applications.

The proportions of the components of the interpolymer can be varied widely, it being necessary only to interpolymerize sufficient polyunsaturated hydrocarbon with the monoolefin or monoolefins to provide the desired level of unsaturation in the polymer, this amount varying with the particular polyunsaturated compound.

Among the polyunsaturated compounds that can be employed in producing the interpolymers utilized herein are various dienes and other polyenes. In order to obtain interpolymers of the structure and properties described above, dienes containing non-conjugated ethylenic groups, and to a lesser extent conjugated alicyclic dienes, are greatly preferred. Included among the polyunsaturated compounds that can be employed are cyclic polyenes, such as cycloalkadienes; substituted-norbornenes, e.g., 5-alkenyl - 2 - norborne; norbornadiene(bicyclo[2.2.1]hepta-2,5-diene) and substituted-norbornadienes, e.g., 2-methyl norbornadiene and other 2-alkyl norbornadienes; unsaturated terpenes, such as limonene; and similar compounds. The polyene may contain substituents, such as halogen or oxygen-containing radicals, but in general it is preferred to employ unsubstituted hydrocarbons containing only carbon and hydrogen. Certain dienes exert a marked influence in lowering molecular weight, even when present only in very small amounts during polymerization. Norbornadiene and 4-vinylcyclohexene-1 have this effect.

Some representative examples of other specific polyunsaturated compounds that can be utilized are:

1,4-pentadiene
1,4-hexadiene
1,9-octadecadiene
11-ethyl-1,1-tridecadiene
1,3-cyclopentadiene
5-methyl-1,3-cyclopentadiene
Tricyclopentadiene
5-methyl1,3-cyclopentadiene dimer
1,4-cyclohexadiene
1,5-cyclooctadiene
1,5,9-cyclododecatriene
1,4,6-cyclooctatriene
5-(2'-butenyl)-2-norbornene
5-(1,5-propenyl)-2-norbornene
5-methylene-2-norbornene
1,8(9)-p-menthadiene
Divinylbenzene
5-vinylbicyclo[2.2.1]hept-2-ene
Bicyclo[4.3.0]nona-3,7-diene Generally speaking, any monoolefin having a single copolymerizable ethylenic group can be interpolymerized with the polyene. Suitable interpolymers for many purposes are made from interpolymerization of the polyunsaturated compound with only a single monoolefin, e.g., copolymers of ethylene and dicyclopentadiene, or propylene and dicyclopentadiene. For other purposes, it is preferred to employ interpolymers of at least two comonomers with the polyunsaturated compound. In either event, it is preferred that ethylene comprise a substantial proportion of the interpolymer, i.e., at least about 20 percent by weight. Classes of preferred interpolymers include copolymers of a nonconjugated diene and ethylene, and interpolymers of a nonconjugated diene, ethylene and at least one other monoolefin having a single terminal ethylenic group, such as propylene.

Of the large number of usable monoolefins, the preferred comonomers include those having the formula:

$$\underset{\underset{R}{|}}{R'}C=CH_2$$

where R is an alkyl group having up to about 20 carbon atoms, or is an aryl radical and R' is hydrogen or alkyl of up to about 20 carbon atoms. Compounds of this class include, for instance, propylene, 2-methylpropene, 2-propylhexene-1, 1-butene, 4-methyl-1-pentene, 1-pentene, 1-hexene, 1-octene, 5-methyl-1-nonene, 5,6,6-trimethyl-1-decene, 1-dodecene, 1-tetradecene, 1-octadecene, styrene and vinyl toluene.

When two or more comonomers are utilized, their proportions are not critical since, as mentioned, copolymers of a single monoolefin with the polyunsaturated compound can be employed. The preferred proportions vary depending on the identity of the particular monomers. For example, interpolymers of ethylene, propylene and a nonconjugated diene such as dicyclopentadiene generally contain from about 10 percent to about 70 percent of ethylene, from about 10 percent to about 40 percent of propylene and from about 5 percent to about 50 percent of the diene, while preferred copolymers contain from about 20 percent to about 90 percent of ethylene and from about 10 percent to about 80 percent of a diene, such as dicyclopentadiene. It will be understood that the minimum usable amount of any diene depends to some extent upon its molecular weight. (The above percentages are by weight; the same is true of all parts and percentages throughout this specification unless otherwise specified.)

The interpolymerization of the foregoing monomers is carried out in the presence of a transition metal catalyst of the Ziegler type; examples of Ziegler catalysts (sometimes called Ziegler-Natta catalysts) are described in U.S. Pats. Nos. 3,153,023; 3,159,615; 3,168,504; and others. They generally involve interaction products of an alkyl aluminum compound and a transition metal compound. In making the interpolymers herein, a preferred catalyst is composed of an organic vanadium compound and an alkyl aluminum halide, with the organic vanadium compound being usually vanadium tris(acetylacetonate) or vanadium oxybis(acetylacetonate). The alkyl aluminum halide co-catalyst is typically ethyl aluminum sesquichloride. Other catalyst systems can also be utilized.

In carrying out the interpolymerization, there is employed a liquid reaction medium, which can be an organic solvent or one of the reactants in liquid form. Purified benzene, xylene, toluene, chlorobenzene, or a similar aromatic solvent is generally utilized, although other solvents can be employed. For efficient operation, care should be taken to exclude oxygen and moisture. The temperature is maintained at room temperature or preferably below, e.g., 20° C. or lower, with temperatures as low as −80° C. or lower being advantageously utilized.

In producing the interpolymer, the catalyst and reactants can all be added initially, or one or more can be added continuously or incrementally. Gaseous reactants are generally fed to the reaction vessel as the polymerization progresses, maintaining saturation of the mixture. Elevated pressures, up to 1000 atmospheres or higher, can be used if desired. The product is usually obtained in solution, and these solutions, after concentration or dilution as desired, can be employed directly in the graft copolymerization. Alternatively, the solid or liquid interpolymer can be isolated and reacted with the ethylenic monomer.

The novel compositions of this invention are made by admixing an aldimine or ketimine such as described above with the interpolymer. The stabilizer is added in an amount of from about 0.05 to about 2 percent by weight, based on the weight of the interpolymer, preferably an amount between about 0.1 and about 0.5 percent is employed. Amounts higher than the above may be utilized; however they are unnecessary and may interfere to some degree with the oxidative cure.

The ketimines and aldimines described above are prepared by condensing the appropriate amine with an aldehyde or ketone in the manner well-known in the art.

The interpolymers described above can be formulated in the coating compositions for either clear coatings or pigmented paints using conventional pigments and additives and can be utilized in ordinary solvent-based compositions employing toluene, xylene, benzene, naphtha and similar aromatic or aliphatic solvents, or in water-containing emulsions, either water and oil or oil and water. They can also be applied as dispersions in plasticizers and/or organic solvents, i.e., as plastisols or organosols.

As discussed above, these interpolymers cure in the presence of oxygen, either at ambient temperature, or more suitably, at somewhat elevated temperatures to provide films of surprisingly great adhesion to most substrates including iron and steel, phosphatized or other treated steel, aluminum, copper, nickel, tin and other metals, as well as wood, glass, plastics, such as polyesters, and polyolefins.

The cured films produced had an excellent hardness, flexibility, abrasion resistance and chemical resistance and similar properties. While complete curing in most cases takes place without additives at temperatures as low as 50° F. or lower over a period of time, it is desirable to heat the film, for instance, at 275° F. to 350° F. for 10 to 40 minutes. Curing temperatures as high as 500° F. or even higher can be utilized.

Curing is also accelerated by the addition of certain driers commonly employed in oxidative cured films. Manganese and cobalt naphthanates are highly desirable in this respect, although other driers such as lead or other metal naphthanates, octolates, and linolates are also of utility, as are similar compounds of these and other heavy metals such as cerium, iron, chromium, copper and nickel. For example, by including about 0.5 percent of manganese naphthanate, films of the interpolymers herein usually dry to a tack-free state in two hours at room temperature (about 77° F.) and complete curing is generally obtained in 100 hours or less.

To illustrate the invention, there are given below several examples of the method practices in the invention, both in producing the aforesaid interpolymers and the formulation of the stabilized compositions of this invention. All parts and percentages are by weight unless otherwise specified.

INTERPOLYMER A

A clean, dry reaction vessel was flushed with nitrogen gas and charged with 10 liters of dried benzene. Ethylene and propylene were passed into the solvent at a rate of 6.0 liters and 12.0 liters per minute, respectively, and there were added 176 milliliters of dicyclopentadiene, 50.4 milliliters of bicyclo[2.2.1]hepta-2,5-diene, and 27.4 milliliters of a 1.4 molar solution of ethyl aluminum sesquichloride in benzene. While maintaining the temperature at about 5° C., 50 milliliters of a 0.02 molar solution of vanadium oxybis(acetylacetonate) in benzene were introduced. The off-gas rate dropped and the ethylene and propylene rates were increased to 10 and 20 liters per minute for one minute, during which the off-gas rate again rose. There were then added 10 milliliters of bicycloheptadiene, 35.2 milliliters of dicyclopentadiene, and 50 milliliters of the vanadium oxybis(acetylacetonate) solution. When absorption decreased, the above additions were again made, and this was repeated for a total of six additions. The polymerization was carried out for a total of 44 minutes from the time of the first vanadium catalyst addition. Methanol was added to the reaction mixture and it was washed with aqueous HCl, and then washed acid free with distilled water. The benzene was stripped at reduced pressure and replaced with about two liters of mineral spirits, and stripping continued until the solution had a solids content of about 43 percent and a Gardner-Holdt viscosity of Y—. Infrared analysis of the product showed the absence of free dicyclopentadiene and indicated that the approximate polymer composition was 50 percent ethylene, 20 percent propylene, and 30 percent dicyclopentadiene, all in polymerized form. The intrinsic viscosity of the interpolymer was 0.25 deciliter/gram.

INTERPOLYMER B

A clean and dry reaction vessel was charged with 2.0 liters of dried benzene and sparged with nitrogen for 15 minutes. While passing ethylene and propylene at the rate of six liters per minute each into the solution, there were added 35.4 milliliters of dicyclopentadiene, and 10.1 milliliters of bicycloheptadiene. The mixture was cooled to 5° C., and 2.0 milliliters of a 1.2 molar solution of ethyl aluminum sesquichloride in benzene were then added. Cooling was maintained throughout the polymerization, which was initiated by the addition of 4.0 milliliters of a 0.05 molar solution of vanadium tris(acetylacetonate) in benzene. Polymerization began immediately, as evidenced by the rise in temperature to 8° C. and complete absorption of all gases passing into the solution, i.e., no off-gas could be observed. After about one minute, off-gas began to be observed once more; reaction conditions were maintained for six minutes after addition of the vanadium compound, during which time the temperature dropped slowly to 5° C. The reaction was terminated by the addition of methanol, and the reaction mixture was washed first with aqueous HCl and then washed acid-free with distilled water. Benzene was stripped off and replaced with aromatic naphtha (boiling range 150° C. to 170° C.) and stripping was continued until the solution had a solids content of 25.0 percent and a Gardner-Holdt viscosity of E. The intrinsic viscosity of the interpolymer produced was 0.20 deciliter/gram.

INTERPOLYMER C

Following a similar procedure to those described, a copolymer of ethylene and dicyclopentadiene was made from the following reaction mixture:

| | Milliliters |
|---|---|
| Benzene | 2000 |
| Norbornadiene | 10 |
| Dicyclopentadiene | 40.7 |
| Ethyl aluminum sesquichloride (1.2 molar solution in benzene) | 2.0 |
| Vanadium tri(acetylacetonate) (0.05 molar solution in benzene) | 4.0 |

The reaction mixture was maintained at about 20° C. and ethylene was passed into the solution at a rate of 12 liters per minute. The product had a solids content of 50 percent and a Gardner-Holdt viscosity of $Z_{10}$. The copolymer obtained had an intrinsic viscosity of 0.24 deciliter/gram.

EXAMPLE I

In this example, the resin employed was an interpolymer of 60 percent ethylene and 40 percent dicyclopentadiene having an intrinsic viscosity of 0.27, prepared in the manner exemplified hereinabove. The resin was utilized as a 47.5 percent solids solution in mineral spirits (boiling range 155–210° C.).

A white coating composition was prepared from a pigment paste comprising:

| | Parts by weight |
|---|---|
| Resin solids | 243.0 |
| TiO$_2$ | 494.6 |
| Aliphatic naphtha (boiling range 85–135° C.) | 224.0 |
| Mineral spirits (boiling range 155–210° C.) | 267.0 |
| Lecithin | 6.0 |

The pigment paste was let down with 768 parts of resin solution and 271.0 parts of aliphatic naphtha (boiling range 85–135° C.) to form a paint containing:

| | Parts by weight |
|---|---|
| Resin solids | 607.0 |
| TiO$_2$ | 494.6 |
| Aliphatic naphtha (boiling range 85–135° C.) | 495.0 |
| Mineral spirits (boiling range 155–210° C.) | 671.4 |
| Lecithin | 6.0 |
| | 2174.0 |

Test paints were prepared, adding 0.1 percent by weight, based on resin solids of phenyl butyraldehyde aldimine with the control being the same coating without the aldimine. Both the stabilized film and the control cured under the same conditions. Test panels were baked for 40 minutes at 250° and 300° F. The following yellowness indices were recorded:

| | 250° F., units | 300° F., units |
|---|---|---|
| 0.1 percent aldimine | 8.6 | 8.23 |
| Control | 15.8 | 19.9 |

While there has been set forth the specific example above, equivalent results are obtained where resins within the scope of the invention are substituted for the polymers of the example, for example, Interpolymers A–C; likewise, the aldimines and ketimines enumerated above may be substituted to achieve results of a similar nature.

According to the provisions of the Patent Statutes, there are described above the invention and what is now considered its best embodiment. However, within the scope of the appended claims, it is to be understood that the invention can be practiced otherwise than as specifically described.

What is claimed is:

1. A curable composition containing a latent stabilizer comprising:
   (A) a non-rubbery interpolymer of a cyclic polyene and at least one olefin having a single copolymerizable double bond, said interpolymer having an essentially saturated carbon chain containing a substantial number of the total carbon atoms in the polymer molecule and having at least about 3.5 percent by weight of ethylenic unsaturation in the polymer molecule and an intrinsic viscosity of no higher than 0.6, measured in benzene at 25° C.; and
   (B) a stabilizing amount of a compound corresponding to the formula:

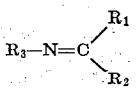

where $R_1$ and $R_2$ are selected from the group consisting of hydrogen, alkyl and aryl radicals and $R_3$ is selected from the group consisting of alkyl, aryl and alicyclic radicals.

2. A composition as in claim 1 wherein the stabilizer is phenyl butyraldehyde aldimine.
3. A composition as in claim 1 wherein the olefin comprises ethylene.
4. A composition as in claim 1 wherein the cyclic polyene comprises dicyclopentadiene.
5. A composition as in claim 1 wherein the olefin comprises ethylene; the cyclic polyene comprises dicyclopentadiene and the stabilizer is phenyl butyraldehyde aldimine.
6. A composition as in claim 1 wherein $R_1$ and $R_2$ are selected from the groups consisting of hydrogen, alkyl, cycloalkyl and phenyl containing a total of up to 20 carbon atoms and $R_3$ is selected from the group consisting of alkyl, cycloalkyl and phenyl containing up to 10 carbon atoms.
7. A composition as in claim 6 wherein the stabilizer is phenyl butyraldehyde aldimine.
8. A composition as in claim 6 wherein the olefin comprises ethylene.
9. A composition as in claim 6 wherein the cyclic polyene comprises dicyclopentadiene.
10. A composition as in claim 6 wherein the olefin comprises ethylene; the cyclic polyene comprises dicyclopentadiene and the stabilizer is phenyl butyraldehyde aldimine.

References Cited

UNITED STATES PATENTS

| 2,426,766 | 9/1947 | Downing | 260—45.9 |
| 2,850,476 | 9/1958 | Seeger et al. | 260—834 |
| 3,207,813 | 9/1965 | Harvey | 260—834 |
| 3,368,974 | 2/1968 | Sparks | 260—45.9 |

FOREIGN PATENTS

| 1,184,747 | 7/1965 | Germany | 260—348 |

DONALD E. CZAJA, Primary Examiner

E. C. RZUCIDLO, Assistant Examiner

U.S. Cl. X.R.

260—23.7, 33.6, 41, 82.1; 117—133, 162